(12) United States Patent
Jin et al.

(10) Patent No.: US 6,646,031 B2
(45) Date of Patent: *Nov. 11, 2003

(54) POLYETHERIMIDE RESIN/POLYESTER RESIN BLENDS HAVING IMPROVED VISUAL CLARITY

(75) Inventors: Yimin Jin, Newburgh, IN (US); Jun Liao, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/063,150

(22) Filed: Mar. 26, 2002

(65) Prior Publication Data

US 2002/0132932 A1 Sep. 19, 2002

Related U.S. Application Data

(62) Division of application No. 09/212,456, filed on Dec. 16, 1998, now Pat. No. 6,403,684.

(51) Int. Cl.[7] .............................. C08K 5/53; C08L 77/06
(52) U.S. Cl. ....................... 524/126; 524/127; 524/133; 524/135; 524/147; 524/151; 524/152; 525/423; 525/425
(58) Field of Search ................................. 525/425, 423; 524/126, 127, 133, 135, 147, 151, 152

(56) References Cited

U.S. PATENT DOCUMENTS

| | | | | |
|---|---|---|---|---|
| 3,803,085 A | * | 4/1974 | Takehoshi et al. | |
| 3,847,867 A | * | 11/1974 | Heath et al. | |
| 3,850,885 A | * | 11/1974 | Takekoshi et al. | |
| 3,852,242 A | * | 12/1974 | White | |
| 3,855,178 A | * | 12/1974 | White et al. | |
| 3,905,942 A | * | 9/1975 | Takekoshi et al. | |
| 3,972,902 A | * | 8/1976 | Heath et al. | |
| 3,983,093 A | * | 9/1976 | Williams, III et al. | |
| 4,141,927 A | * | 2/1979 | White et al. | |
| 4,448,937 A | * | 5/1984 | Bopp et al. | |
| 4,455,410 A | * | 6/1984 | Giles, Jr. | |
| 4,587,299 A | * | 5/1986 | Giles, Jr. | |
| 4,629,759 A | * | 12/1986 | Rock | |
| 4,657,987 A | * | 4/1987 | Rock et al. | |
| 4,673,708 A | * | 6/1987 | Rock et al. | |
| 4,908,418 A | * | 3/1990 | Holub | |
| 5,221,730 A | * | 6/1993 | Morris et al. | |
| 5,237,038 A | * | 8/1993 | Morris et al. | |
| 5,284,903 A | * | 2/1994 | Minnick | |
| 5,439,937 A | * | 8/1995 | Djuric et al. | |
| 5,439,987 A | * | 8/1995 | Scott et al. | |
| 5,521,258 A | | 5/1996 | Cooper et al. | |
| 5,541,244 A | | 7/1996 | van der Meer et al. | |
| 5,648,433 A | | 7/1997 | Scott | |
| 5,852,085 A | | 12/1998 | Brown et al. | |
| 6,403,684 B1 | * | 6/2002 | Jin et al. | ..................... 524/135 |

FOREIGN PATENT DOCUMENTS

| | | | |
|---|---|---|---|
| EP | 0850922 A1 | * | 7/1998 |
| EP | 0 900828 A1 | * | 3/1999 |
| JP | 1315465 | * | 12/1989 |
| JP | 2041355 | * | 2/1990 |
| JP | 7228761 | * | 8/1995 |

* cited by examiner

*Primary Examiner*—Ana Woodward

(57) ABSTRACT

Transparent thermoplastic resin compositions include a polyetherimide resin, a polyester resin, sodium benzene phosphinate, and optionally 3,4-epoxy cyclohexylmethyl-3, 4-epoxy cyclohexanecarboxylate and preferably comprising a first polyester resin and a second polyester resin and sodium benzene phosphinate, wherein from 50 to 100 mole percent of the structural units of the first polyester resin include an alicyclic hydrocarbon radical as the diol residue of the structural unit, and wherein less than 50 mole percent of the structural units of the second polyester include an alicyclic hydrocarbon radical as the diol residue of the structural unit, exhibit resistance to elevated temperature and improved impact properties.

35 Claims, No Drawings

POLYETHERIMIDE RESIN/POLYESTER RESIN BLENDS HAVING IMPROVED VISUAL CLARITY

CROSS REFERENCE TO RELATED APPLICATIONS

This application is a divisional application of application Ser. No. 09/212,456 filed on Dec. 16, 1998, now U.S. Pat. No. 6,403,684 which is incorporated by reference herein.

BACKGROUND OF INVENTION

The disclosure relates to thermoplastic resin blends, more specifically to certain transparent blends of polyetherimide resins and polyester resins.

Blends of polyetherimide resins and polyester resins derived predominantly from cyclohexanedimethanol and a carbocyclic dicarboxylic acid, such as, for example, a poly(cyclohexane-dimethanol terephthalate) resin that provide improved impact strength are disclosed in U.S. Pat. No. 5,439,987. Blends of polyetherimide resins and copolyesters of terephthalic acid and/or isoterephthalic acid, 1,4-cyclohexanedimethanol and ethylene glycol, that is, certain poly(cyclohexane-1,4-dimethylene-co-ethylene terephthalate) resins that are said to exhibit a high flexural modulus are disclosed in U.S. Pat. No. 5,439,987.

Polyetherimide-polyester blends that exhibit transparency, resistance to elevated temperature, reduced processing temperatures, and further improvements are desired.

SUMMARY OF INVENTION

In a first embodiment, the present invention is directed to a transparent thermoplastic resin composition, comprising a mixture, based on 100 parts by weight of the thermoplastic resin composition, of:

(a) from about 1 to about 99 pbw of a polyetherimide resin;

(b) from about 1 to about 99 pbw of a polyester; and (c) from about 0.001 to about 1.5 pbw sodium benzene phosphinate.

In a preferred embodiment, the present invention is directed to a thermoplastic resin composition, comprising a mixture, based on 100 pbw of the thermoplastic resin composition, of:

(a) from about 1 to about 99 pbw of a polyetherimide resin comprising structural units of the formula:

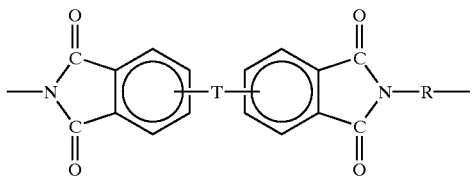

wherein each R is independently paraphenylene or metaphenylene and T is a divalent radical according to the formula:

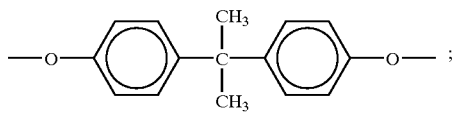

(b) from about 2 to about 15 pbw of a poly(cyclohexane-1,4-dimethylene terephthalate) resin;

c) from 0 to about 48 pbw of one or more second polyester resins selected from copolyester resins, wherein said copolyester resins each comprise recurring structural units, each structural unit comprises a diol residue and a diacid residue, each of the structural units comprises a 1,4-phenylene or 1,3-phenylene radical as the diacid residue of the structural unit and from 50 to 90 mole percent of the structural units comprise a dimethylene radical as the diol residue of the unit and from 0 to 50 mole percent of the structural units comprise a cyclohexane-1,4-dimethylene radical as the diol residue of the structural unit, and poly(ethylene terephthalate) resins; and d) between 0.001 and about 1.5 pbw sodium benzene phosphinate.

DETAILED DESCRIPTION

In a preferred embodiment, the thermoplastic resin composition of the present invention comprises, based on 100 pbw of the thermoplastic resin composition, a mixture of (a) from about 1 to about 99 pbw, more preferably from 80 to 95 pbw polyetherimide resin, (b) from about 1 to about 99 pbw polyester resin, more preferably: (i) from about 5 to about 40 pbw, of the first polyester resin, if from 90 mol % to 100 mol % of the structural units of the first polyester resin comprise a divalent alicyclic hydrocarbon radical as the diol residue of the structural unit or (ii) from about 2 to about 35, preferably about 5 to about 25 pbw, more preferably from about 5 to about 20 pbw, of the first polyester resin, if from 50 mol % to less than 90 mol % of the structural units of the first polyester comprise a divalent alicyclic hydrocarbon radical as the diol residue of the structural unit; (c) from about 0 to about 48 pbw, more preferably about 2 to about 35 pbw, most preferably from about 2 to about 20 pbw, of the second polyester resin; (d) up to about 1.5 pbw, more preferably about 0.001 to about 0.1 pbw sodium benzene phosphinate; and optionally (e) up to about 6.0 pbw 3,4-epoxy cyclohexylmethyl-3,4-epoxy cyclohexanecarboxylate and/or sodium stearate.

In an alternative preferred embodiment, the thermoplastic resin composition of the present invention comprises, based on 100 pbw of the thermoplastic resin composition, a mixture of from 80 to 95 pbw of the polyetherimide resin, from 5 to 12 pbw of the first polyester resin comprising about 0.5 to about 2.0 pbw 3,4-epoxy cyclohexylmethyl-3,4-epoxy cyclohexanecarboxylate and up to about 0.08 pbw sodium stearate; from 2 to 35 pbw of the third polyester resin; and about 0.005 to about 0.05 pbw sodium benzene phosphinatel.

In a preferred embodiment, the thermoplastic resin composition of the present invention the first and second polyester resins are present in a weight first polyester resin: weight second polyester resin ratio of from 0.5:1 to 1:4, more preferably from 1:1 to 1:3, and still more preferably from 1:1 to 1:2.

In an alternative preferred embodiment, the thermoplastic resin composition of the present invention the first and third polyester resins are present in a weight first polyester resin: weight third polyester resin ratio of from 1:1 to 1:3, more preferably from 1:1 to 1:2.

The polyetherimide resins useful with the present invention are known compounds whose preparation and properties are described in U.S. Pat. Nos. 3,803,085 and 3,905,942, each of which is incorporated herein by reference.

Preferably, the polyetherimide used for preparing the blends of this invention comprises more than 1, typically from about 10 to 1000 or more, and more preferably from about 10 to about 500 structural units, of the formula (I):

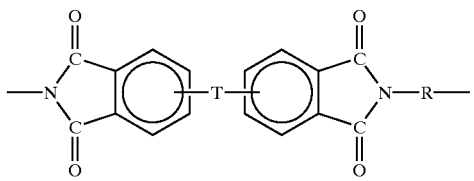

wherein T is —O— or a group of the formula —O—Z—O— wherein the divalent bonds of the —O— or the —O—Z—O— group are in the 3,3', 3,4', 4,3', or the 4,4' positions; Z includes, but is not limited to, a divalent radical of formulae (II)

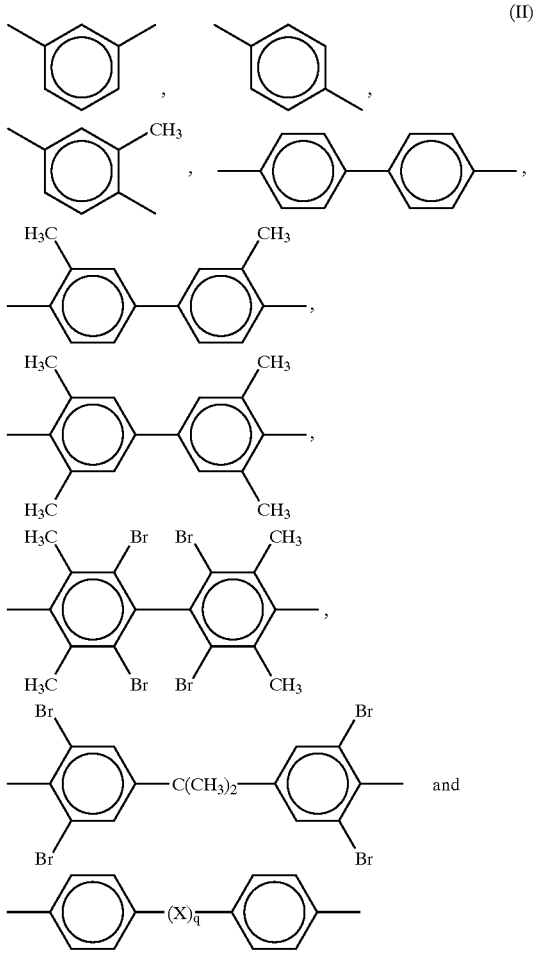

wherein X includes, but is not limited to, divalent radicals of the formulae (III):

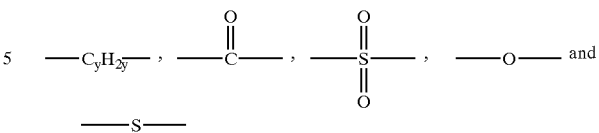

(III)

wherein y is an integer from 1 to about 5, and q is 0 or 1; R includes, but is not limited to, a divalent organic radical: (a) aromatic hydrocarbon radicals having from 6 to about 20 carbon atoms and halogenated derivatives thereof, (b) alkylene radicals having from about 2 to about 20 carbon atoms, (c) cycloalkylene radicals having from about 3 to about 20 carbon atoms, and (d) divalent radicals of the general formula (IV):

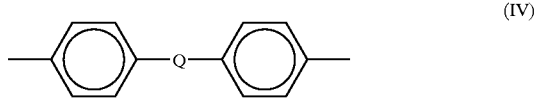

(IV)

where Q includes, but is not limited to, the formulae (V):

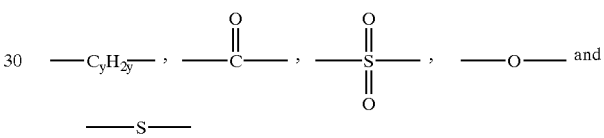

(V)

where y is an integer from about 1 to about 5.

In one embodiment, the polyetherimide may be a copolymer which, in addition to the etherimide units described above, further contains polyimide structural units of the formula (VI):

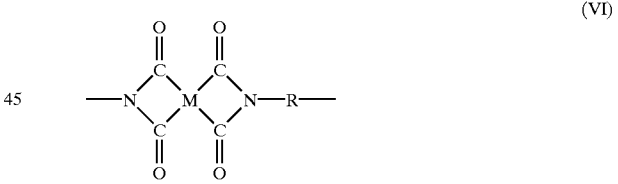

(VI)

wherein R is as previously defined for formula (I) and M includes, but is not limited to, formula (VII):

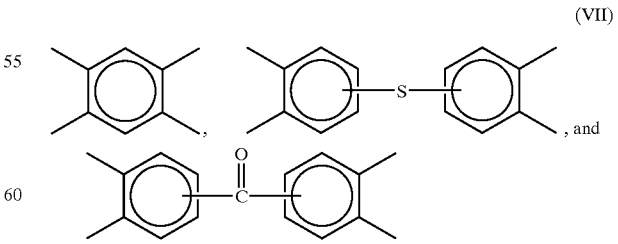

(VII)

The polyetherimide can be prepared by any of the methods well known to those skilled in the art, including the reaction of an aromatic bis(ether anhydride) of the formula (VIII):

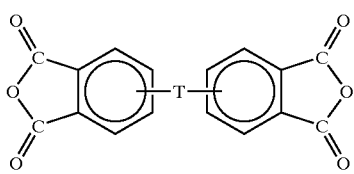
(VIII)

with an organic diamine of the formula (IX):

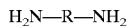
(IX)

wherein T and R are defined as described above in formula (I). In general the reactions can be carried out employing well-known solvents, e.g., o-dichlorobenzene, m-cresol/toluene and the like to effect interaction between the anhydride of formula (VIII) and the diamine of formula (IX), at temperatures of about 100° C. to about 250° C. Alternatively, the polyetherimide can be prepared by melt polymerization of aromatic bis(ether anhydride)s and diamines accomplished by heating a mixture of the ingredients to elevated temperatures with concurrent stirring. Generally melt polymerizations employ temperatures of about 200° C. to about 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated herein by reference.

Illustrative examples of aromatic bis(ether anhydride)s of formula (VIII) include: 2,2-bis[4-(3,4-dicarboxyphenoxy) phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (VIII) above includes, but is not limited to, compounds wherein T is of the formula (X):

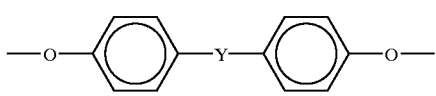
(X)

and the ether linkages, for example, are preferably in the 3,3', 3,4', 4,3', or 4,4' positions, and mixtures thereof, and where Y includes, but is not limited to, the formulae (XI):

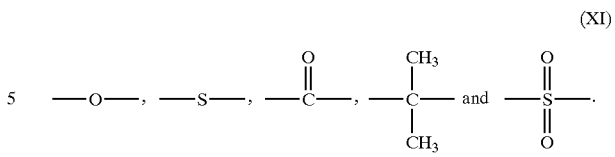
(XI)

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (IX) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl) methane; 3-methylheptamethylenediamine; 4,4-dimethyl- heptamethylenediamine; 2,11-dodecanediamine; 2,2-dimethylpropylenediamine; 1,18-octamethylenediamine; 3-methoxyhexamethylenediamine; 2,5-dimethyl- hexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Generally, useful polyetherimides have a melt index of between 0.1 and 10 grams per minute ("g/min"), as measured by American Society for Testing Materials ("ASTM") D1238 at 295° C., using a 6.6 kilogram ("kg") weight.

In a preferred embodiment, the polyetherimide resin of the present invention resin has a weight average molecular weight of 10,000 to 150,000 grams per mole ("g/mole"), as measured by gel permeation chromatography, using a polystyrene standard. Such polyetherimide resins typically have an intrinsic viscosity [η] greater than about 0.2 deciliters per gram, preferably about 0.35 to about 0.7 deciliters per gram measured in m-cresol at 25° C.

Included among the many methods of making the polyetherimide are those disclosed in U.S. Pat. Nos. 3,847,867, 3,814,869, 3,850,885, 3,852,242, 3,855,178, and 3,983,093. These patents are incorporated herein by reference for the purpose of teaching, by way of illustration, general and specific methods for preparing polyetherimide for use in the blends of this invention.

In a preferred embodiment, the polyetherimide resin comprises structural units according to formula (I) wherein each R is independently paraphenylene or metaphenylene and T is a divalent radical of the formula (XII):

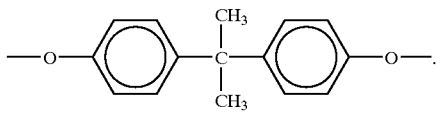
(XII)

The polyester resins of the composition of the present invention are typically obtained through the condensation or ester interchange polymerization of a diol or diol equivalent with a diacid or diacid equivalent and each comprise recurring structural units according to formula (XIII):

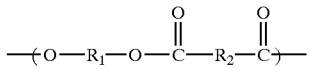
(XIII)

wherein $R_1$ represents the residue of the diol or diol equivalent ("diol residue"), $R_2$ represents the residue of the diacid or diacid equivalent ("diacid residue"), and each $R_1$ and $R_2$ is independently a divalent acyclic hydrocarbon radical, a divalent alicyclic hydrocarbon radical or a divalent aromatic hydrocarbon radical.

As used herein, the terminology "acyclic hydrocarbon radical" means a straight chain or branched saturated hydrocarbon radical, preferably containing about 2 to about 12 carbon atoms per radical, such as, for example, dimethylene, trimethylene, tetramethylene, hexamethylene and octamethylene, among others.

As used herein, the terminology "alicyclic hydrocarbon radical" means a hydrocarbon radical containing one or more saturated hydrocarbon rings, preferably containing about 4 to about 10 carbon atoms per ring, per radical which may optionally be substituted on one or more of the rings with one or more alkyl or alkylene groups, each preferably containing about 2 to about 6 carbon atoms per group and which, in the case of two or more rings, may be fused rings, such as, for example, 2,2,4,4-tetramethyl-1,3-cyclobutylene, 1,4-cyclohexylene, cyclohexylene-1,4-dimethylene, and 1,4-cyclooctylene, among others.

As used herein, the term "aromatic hydrocarbon radical" means a hydrocarbon radical containing one or more aromatic rings per radical, which may optionally be substituted on the one or more aromatic rings with one or more alkyl or alkylene groups, each preferably containing about 2 to about 6 carbon atoms per group and which, in the case of two or more rings, may be fused rings, such as, for example, 1,2-phenylene, 1,3-phenylene, 1,4-phenylene, 2,6-naphthalene, and 2,7-phenathrylene, among others.

Suitable diols include acyclic diols such as, for example, ethylene glycol, 1,3-propylene glycol, 1,4-butane glycol, 1,5-pentane diol, 1,6-hexane diol, 1,7-heptane diol, 1,8-octane diol, 1,9-nonane diol, 1,10-decane diol, 1,12-dodecane diol; alicyclic diols such as, for example, 2,2,4,4-tetramethyl-1,3-cyclobutane diol, 3,4-cyclopentanediol, 1,4-cyclohexanedimethanol, including cis-1,4-cyclohexanedimethanol and trans-1,4-cyclohexanedimethanol; and aromatic diols such as, for example, bisphenol A and hydroquinone, among others. Suitable diol equivalents include corresponding esters and ethers, such as for example, dialkyl esters and diaryl esters, among others.

Suitable diacids include, for example, dicarboxylic acids, such as, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid cis-1,4-cyclohexane dicarboxylic acid, trans-1,4-cyclohexane dicarboxylic acid, 4,4'-bisbenzoic acid, and naphthalene-2,6-dicarboxylic acid, among others. Suitable diacid equivalents include, for example, corresponding anhydride, ester or halide derivatives, such as, for example, phthalic anhydride, dimethyl terephthalate, and succinyl chloride, among others.

In a preferred embodiment, the polyester resins have a number average molecular weight of about 10,000 to about 100,000 g/mole, more preferably about 15,000 to about 50,000 g/mole, as measured by gel permeation chromatography using a polystyrene standard.

Methods for making polyester resins are well know in the art, see for example, Kirk-Othmer Encyclopedia of Chemical Technology, Fourth Edition, Vol. 19 at pp. 609–653, John Wiley & Sons (1996).

First Polyester Resin

In a preferred embodiment, from 90 to 100 mol %, more preferably about 100 mol %, and most preferably 100 mol %, of the structural units of the first polyester resin comprise a divalent alicyclic hydrocarbon radical, most preferably a cyclohexane-1,4-dimethylene radical, as the diol residue of the structural unit and any remaining structural units of the first polyester resin preferably comprise a divalent acyclic hydrocarbon radical, most preferably a dimethylene radical, as the diol residue of the structural unit.

In an alternative preferred embodiment, from 50 to less than 90 mol %, more preferably from 60 to 85 mol % of the structural units of the first polyester resin comprise a divalent alicyclic hydrocarbon radical, most preferably a cyclohexane-1,4-dimethylene radical, as the diol residue of the structural unit and the remaining structural units of the first polyester resin preferably comprise a divalent acyclic hydrocarbon radical, most preferably a dimethylene radical, as the diol residue of the structural unit.

In a preferred embodiment, the first polyester resin comprises structural units wherein a divalent aromatic hydrocarbon radical, preferably a 1,4-phenylene radical or 1,3-phenylene radical, most preferably a 1,4-phenylene radical, is the diol residue of the structural unit. In a highly preferred embodiment, each of the structural units of the first polyester resin comprise a divalent aromatic hydrocarbon radical, each independently a 1,4-phenylene radical or a 1,3-phenylene radical, most preferably a 1,4-phenylene radical, as the diacid residue of the structural unit.

In a highly preferred embodiment, the first polyester resin is a poly(cyclohexane-1,4-dimethylene terephthalate) resin. Suitable polyester resins are made, for example, by the polymerization of 1,4-cyclohexanedimethanol with terephthalic acid.

Other examples of possible first polyester resins include, but are not limited to, poly(cyclohexanedimethanol terephthalate), copolymers of terephthalic acid with ethylene glycol and cyclohexanedimethanol, and copolymers of 2,6-naphthalene dicarboxylic acid with ethylene glycol and cyclohexanedimethanol, among others.

Second Polyester Resin

In a first preferred embodiment, from 0 to less than about 50 mol %, preferably about 10 to less than 50 mol %, still more preferably from about 20 to about 40 mol %, of structural units of the second polyester resin comprise a divalent alicyclic hydrocarbon radical, most preferably a cyclohexane-1,4-dimethylene radical, as the diol residue of the structural unit and about 50 to about 90 mol %, more preferably about 60 to about 80 mol %, of the structural units of the second polyester resin comprise a divalent acyclic hydrocarbon radical, most preferably a dimethylene radical, as the diol residue of the structural unit.

In a second preferred embodiment, 100 mol % the structural units of the second polyester resin comprise a divalent acyclic hydrocarbon radical, most preferably a dimethylene radical, as the diol residue of the structural unit.

In a preferred embodiment, the second polyester resin is a copolyester resin comprising recurring structural units wherein each structural unit comprises a divalent aromatic hydrocarbon radical, preferably a 1,4-phenylene radical or 1,3-phenylene radical, most preferably a 1,4-phenylene radical, is the diacid residue of the structural unit. In a highly preferred embodiment, each of the structural units of the second polyester resin comprise a divalent aromatic hydrocarbon radical, each independently a 1,4-phenylene radical or a 1,3-phenylene radical, most preferably a 1,4-phenylene radical, as the diacid residue of the structural unit.

In a first highly preferred embodiment, the second polyester resin is a poly (ethylene-co-cyclohexane-1,4-dimethylene terephthalate) resin. Suitable polyester resins are made, for example, by the polymerization of ethylene glycol and 1,4-cyclohexanedimethanol with terephthalic acid.

In a second highly preferred embodiment, the second polyester resin is a poly (ethylene terephthalate) resin. Suitable polyester resins are made, for example, by the polymerization of ethylene glycol with terephthalic acid.

Other possible second polyester resins include, but are not limited to: poly (ethylene terephthalate), poly(ethylene naphthalate), poly(butylene naphthalate), copolymers of terephthalic acid with ethylene glycol and cyclohexanedimethanol, or copolymers of 2,6-naphthalene dicarboxylic acid with ethylene glycol and cyclohexanedimethanol, among others, wherein the second polyester resin is different from the first polyester resin.

Third Polyester Resin

In a first preferred embodiment, about 50 to less than about 90 mol % of structural units of the third polyester resin comprise a divalent alicyclic hydrocarbon radical, most preferably a cyclohexane-1,4-dimethylene radical, as the diol residue of the structural unit and about 0 to about 50 mol % of the structural units of the third polyester resin comprise a divalent acyclic hydrocarbon radical, most preferably a dimethylene radical, as the diol residue of the structural unit. In a highly preferred embodiment, the third polyester resin is a poly(cyclohexane-1,4-dimethylene-co-dimethylene terephthalate) copolymer. Suitable polyester resins are made, for example, by the polymerization of 1,4-cyclohexanedimethanol and ethylene glycol with terephthalic acid.

In a second preferred embodiment, about 10 to less than about 50 mol % of structural units of the third polyester resin comprise a divalent alicyclic hydrocarbon radical, most preferably a cyclohexane-1,4-dimethylene radical, as the diol residue of the structural unit and about 50 to about 90 mol % of the structural units of the third polyester resin comprise a divalent acyclic hydrocarbon radical, most preferably a dimethylene radical, as the diol residue of the structural unit. In a highly preferred embodiment, the third polyester resin is a poly(ethylene-co-cyclohexane-1,4-dimethylene terephthalate) copolymer. Suitable polyester resins are made, for example, by the polymerization of ethylene glycol and 1,4-cyclohexanedimethanol with terephthalic acid.

In a third preferred embodiment, 100 mol % the structural units of the third polyester resin comprise a divalent acyclic hydrocarbon radical, most preferably a dimethylene radical, as the diol residue of the structural unit. In a highly preferred embodiment, the third polyester resin is a poly(ethylene terephthalate) resin. Suitable polyester resins are made, for example, by the polymerization of ethylene glycol with terephthalic acid.

In a preferred embodiment, the third polyester resin comprises structural units wherein a divalent aromatic hydrocarbon radical, preferably a 1,4-phenylene radical or 1,3-phenylene radical, most preferably a 1,4-phenylene radical, is the diol residue of the structural unit. In a highly preferred embodiment, each of the structural units of the third polyester resin comprise a divalent aromatic hydrocarbon radical, each independently a 1,4-phenylene radical or a 1,3-phenylene radical, most preferably a 1,4-phenylene radical, as the diacid residue of the structural unit.

Compounding Additive

Blends of polyetherimide and poly(1,4-cyclohexanedimethyl terephthalate) become visually clear, i.e. transparent, when formed by directly blending metal phosphate salt, e.g. sodium benzene phosphinate into the formulation during compounding, i.e. melt mixing the blend with a twin or single extruder. "Transparent" as used herein means having the property of transmitting rays of light through its substance so that bodies situated beyond or behind can be distinctly seen. Typically sufficient sodium benzene phosphinate to render the blend transparent is mixed into the blend during compounding, with up to about 1.5 pbw sodium benzene phosphinate (based upon a 100 pbw thermoplastic composition) preferred, and about 0.001 to about 0.1 especially preferred.

Other Additives

A coupling agent such as an epoxy, including, but not limited to, 3,4-epoxy cyclohexylmethyl-3,4-epoxy cyclohexanecarboxylate, epoxidized soy bean oil, and mixtures thereof, among others, can be used to improve impact and hydrolytic resistance, tab-bending performance, and other characteristics of the molded blend, while a catalyst, such as a metal phosphate salt, including, but not limited to, sodium benzoate phosphate may be employed to improve the reactivity between the polyester and epoxy. Other useful coupling agents include the orthoester compounds, preferably compounds containing at least two orthoester moieties per compound.

The coupling agent and catalyst may be added to the blend either directly or can be precompounded with the polyester resin, preferably the first polyester resin. If added directly into the blend, up to about 5.0 pbw 3,4-epoxy cyclohexylmethyl-3,4-epoxy cyclohexanecarboxylate and/or up to about 1.0 pbw sodium stearate can be utilized, with about 0.1 to about 2.0 pbw 3,4-epoxy cyclohexylmethyl-3,4-epoxy cyclohexanecarboxylate and/or 0.001 to about 1.0 pbw sodium stearate preferred. Alternatively, if the 3,4-epoxy cyclohexylmethyl-3,4-epoxy cyclohexanecarboxylate and/or sodium stearate are pre-compounded into the polyester resin, preferably the first polyester resin, up to about 25.0 pbw 3,4-epoxy cyclohexylmethyl-3,4-epoxy cyclohexanecarboxylate and/or sodium stearate, balance polyester resin can be used, with about 0.5 pbw to about 5.0 pbw 3,4-epoxy cyclohexylmethyl-3,4-epoxy cyclohexanecarboxylate, about 0.001 to about 1.0 pbw sodium stearate, balance polyester resin preferred, wherein the pbw is based on 100 pbw polyester resin, 3,4-epoxy cyclohexylmethyl-3,4-epoxy cyclohexanecarboxylate, and sodium stearate.

Additionally, the thermoplastic resin composition of the present invention may optionally also contain various conventional additives, such as antioxidants, such as, for example, organophosphites, for example, tris(nonyl-phenyl) phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetra-cis(methylene)-3,5-di-t-butyl-4-hydroxycinnamate, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphenyl) propionic acid with mono-or polyhydric alcohols, esters of thioalkyl or thioaryl compounds, such as, for example, distearylthiopropionate, dilaurylthiopropionate, ditridecylthiodipropionate, amides of beta-(3,5-di-tert-butyl-4-hydroxyphenol)-propionic acid; fillers and reinforcing agents, such as, for example, silicates, $TiO_2$, glass fibers, carbon black, graphite, carbon fibrils, calcium carbonate, talc, mica and other additives such as, for example, UV absorbers, light stabilizers, lubricants, plasticizers, pigments, dyes, colorants, anti-static agents, blowing agents.

The preparation of the compositions of the present invention is normally achieved by merely blending the ingredients under conditions for the formation of an intimate blend. Such conditions often include solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the blend through at least one vent port in the extruder to remove volatile impurities in the composition.

The composition of the present invention can be molded into useful articles, such as, for example, heat resistant containers, by a variety of means such as, for example, injection molding and extrusion, among others conventionally known in the art.

EXAMPLES

The samples 1–7 set forth in Table I below are prepared by combining the components using a 30 minute twin screw extruder at 540–600° F.

| | |
|---|---|
| PEI | Polyetherimide resin made by condensation of 2,2-bis[4-(3,4-dicarboxyphenoxy)phenyl]propane dianhydride with metaphenylene diamine and having a melt index of 0.9 g/min at 337° C. (Ultem ® 1000 available from General Electric Company, Pittsfield, MA); |
| PCT | Poly(cyclohexanedimethanol terephthalate) resin having a nominal inherent viscosity of 0.77, (Ektar ™ PCT 13787 resin, Eastman Chemical Company, Kingsport, TN); and |
| SBP | Sodium benzene phosphinate (AKZO Chemicals, Inc., Dobbs Ferry, NY); |
| SDP | Monosodium phosphate (PB. & S. Chemical, Henderson, KY) |
| ERL 4221 | 3,4-epoxy cyclohexylmethyl-3,4-epoxy cyclohexanecarboxylate (ERL 4221, Union Carbide, Danbury, CT); and |
| Na-Stearate | Sodium stearate (Witco Chemical Co., Edicott, NY). |

TABLE I

| | Sample Nos. | | | | | |
|---|---|---|---|---|---|---|
| Properties | 1 | 2 | 3 | 4 | 5 | 6 |
| PEI | 95 | 90 | 79.7 | 80 | 80 | 80 |
| PCT | 5 | 10 | 20 | 20 | 20 | 20 |
| SBP | — | — | — | — | 0.05 | 0.05 |
| SDP | — | — | 0.3 | — | — | — |
| ERL 4221 | — | — | — | — | — | 1.0 |
| Na-Stearate | — | — | — | — | — | 0.05 |

TABLE II

| | Sample Nos. | | | | | |
|---|---|---|---|---|---|---|
| Properties | 1 | 2 | 3 | 4 | 5 | 6 |
| Transparent | Yes | Yes | No | No | Yes | Yes |
| M.I. (g/min) | 0.2 | 0.21 | 0.42 | 0.46 | 1.63 | 1.62 |
| HDT (° C.) | 184 | 178 | 184 | 175 | 160 | 167 |
| Tensile strength (kpsi) | 15.4 | 15.5 | — | — | — | — |
| Tensile strength (at break) (kpsi) | 11.3 | 11.6 | 10.7 | 11.0 | 9.04 | 7.42 |
| Tensile Modulus (kpsi) | 497 | 460 | 389 | 420 | 505 | 415 |
| Flexure Strenth (at break) (kpsi) | 23.8 | 22.6 | 21.1 | 21.0 | 18.5 | 18.5 |
| Flexure Modulus (kpsi) | 538 | 500 | 478 | 466 | 491 | 457 |
| Reverse Notched Izod (ft-lb/in) | 21.6 | 23.3 | 39.9 | 39.9 | 15.9 | 20.6 |
| Specific Gravity | 1.27 | 1.27 | 1.26 | 1.26 | 12.6 | 1.26 |

As can be seen from Table II, the samples with sodium benzene phosphinate, Samples 5 and 6, were transparent while the samples without, Samples 3 and 4, including the sample with monosodium phosphate which was reported in U.S. Pat. No. 5,284,903 to Minnick (commonly assigned), were opaque. Furthermore, Samples 5 and 6 showed improved melt flow (M.I. more than tripled) and reduced processing temperature (HDT reduced about 15–25° C.), while at least maintaining the other mechanical properties, with the addition of the 3,4-epoxy cyclohexylmethyl-3,4-epoxy cyclohexanecarboxylate which improved the reverse notched Izod.

What is claimed is:

1. A thermoplastic resin composition, comprising a mixture, based on 100 pbw of the thermoplastic resin composition, of:
    (a) from about 1 to about 99 pbw of a polyetherimide resin;
    (b) from about 1 to about 99 pbw of a polyester resin;
    (c) from 0.001 and about 1.5 pbw metal phosphate salt; and
    (e) up to about 6.0 pbw epoxy compound.

2. The thermoplastic resin composition of claim 1, wherein said polyester resin comprises:
    (a) from about 2 to about 40 pbw of a first polyester resin comprising recurring structural units, wherein each structural unit comprises a diol residue and a diacid residue and wherein from 50 to 100 mole percent of the structural units of the first polyester resin comprise a divalent alicyclic hydrocarbon radical as the diol residue of the structural unit, and (b) from 0 to about 48 pbw of a second polyester resin comprising recurring structural units, wherein each structural unit comprises a diol residue and a diacid residue and wherein from 0 to less than 50 mole percent of the structural units of the second polyester resin comprise a divalent alicyclic hydrocarbon radical as the a diol residue of the structural unit.

3. The thermoplastic resin composition of claim 2, wherein the composition comprises from about 2 to about 15 pbw of the first polyester resin and from 90 mole percent to 100 mole percent of the structural units of the first polyester resin comprise a divalent alicyclic hydrocarbon radical as the a diol residue of the structural unit.

4. The thermoplastic resin composition of claim 2, wherein the structural units of the first polyester resin each comprise a 1,4-phenylene or, 1,3-phenylene radical as the diacid residue of the structural unit.

5. The thermoplastic resin composition of claim 2, wherein 100 mole percent of the structural units of the first polyester resin comprise a cyclohexane-1,4-dimethylene radical as the diol residue of the structural unit.

6. The thermoplastic resin composition of claim 2, wherein the first polyester resin is a poly(cyclohexane-1,4-dimethylene terephthalate) resin.

7. The thermoplastic resin composition of claim 2, wherein about 50 mole percent to 90 mole percent of the structural units of the second polyester resin comprise a dimethylene radical as the diol residue of the structural unit and about 10 mole percent to less than 50 mole percent mole percent of the structural units of the second polyester resin comprise a cyclohexane-1,4-dimethylene radical as the diol residue of the structural unit.

8. The thermoplastic resin composition of claim 2, wherein 100 mole percent of the structural units of the second plolyester resin comprise a dimethylene radical as the diol residue of the structural unit.

9. The thermoplastic resin composition of claim 2, wherein the structural units of the second polyester resin each comprise a 1,4-phenylene or 1,3-phenylene radical as the diacid residue of the structural unit.

10. The thermoplastic resin composition of claim 2, wherein the second polyester resin is a poly(ethylene-co-cyclohexane-1,4-dimethylene terephthalate) resin.

11. The thermoplastic resin composition of claim 2, wherein the second polyester resin is a poly(ethylene terephthalate) resin.

12. The thermoplastic resin composition of claim 2, wherein the first polyester is present in an amount of from about 5 to about 40 pbw, and further wherein from 90 to 100 mole percent of the structural units of the first polyester resin comprise a divalent alicyclic hydrocarbon radical as the diol residue of the structural unit.

13. The thermoplastic resin composition of claim 2, wherein the first polyester is present in an amount of from about 2 to about 35 pbw, and further wherein from 50 mole percent to less than 90 mole percent of the structural units of the first polyester resin comprise a divalent alicyclic hydrocarbon radical as the diol residue of the structural unit.

14. The thermoplastic resin composition of claim 2, wherein the second polyester comprises structural units having a dimethylene radical as the diol residue and the diacid residue is free of a 2,6-naphthalene dicarboxylate radical.

15. The thermoplastic resin composition of claim 2, wherein the polyetherimide resin is present in an amount greater than 65 pbw if less than or equal to 60 mole percent of the structural units of the first polyester resin comprise a divalent alicyclic radical as the a diol residue of the structural unit.

16. The thermoplastic resin composition of claim 1, wherein the composition comprises from about 60 to about 90 pbw of the polyetherimide resin, from about 5 to about 40 pbw of said polyester resin, and from about 0.001 to about 0.1 pbw metal phosphate salt.

17. The thermoplastic resin composition of claim 1, wherein the composition further comprises sodium stearate.

18. The thermoplastic resin composition of claim 1, wherein the polyetherimide resin comprises structural units of the formula (I):

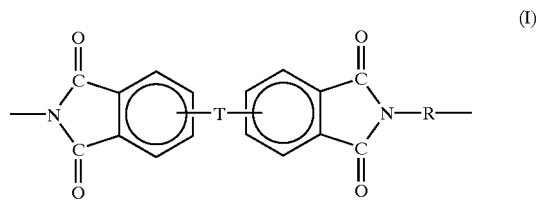

wherein T is —O— or a group of the formula —O—Z—O— wherein the divalent bonds of the —O— or the —O—Z—O group are in the 3,3',3,4',4,3', or the 4,4' positions; Z is of formulae (II):

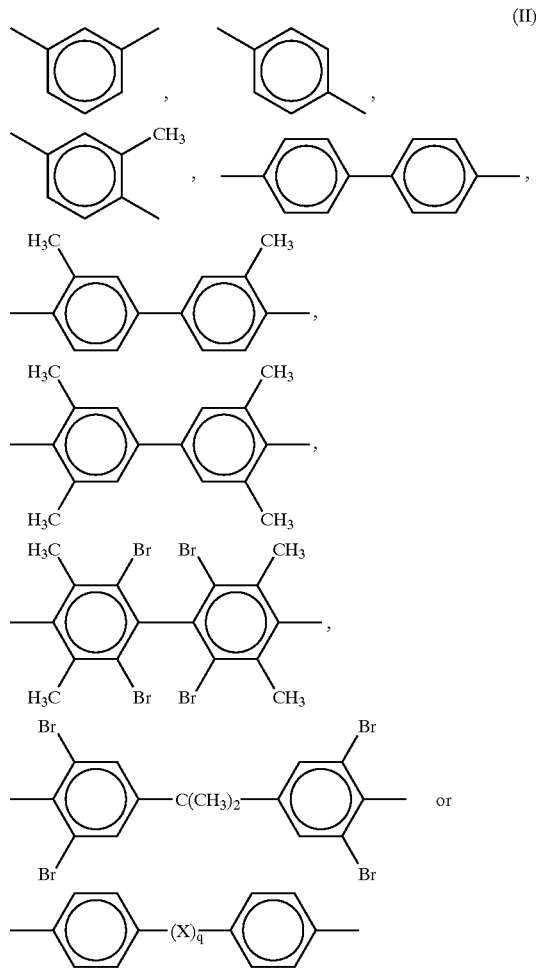

wherein X is of formulae (III):

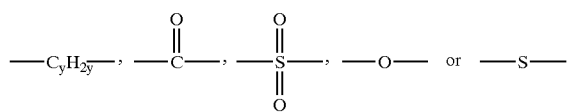

wherein y is an integer from 1 to about 5, and q is 0 or 1; R is a divalent organic radical of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, or (d) divalent radicals of formula (IV):

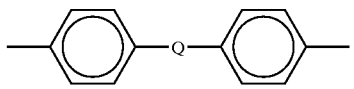

where Q is of formulae (V):

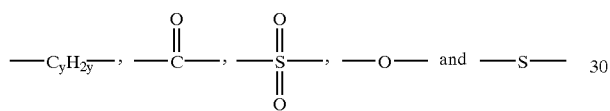

where y is an integer from about 1 to about 5.

19. The thermoplastic resin composition of claim 1, wherein the polyetherimide resin is the reaction product formed by melt polymerization of 2,2-bis[4-(3,4-dicarboxyphenoxy)phenyl]propane dianhydride with metaphenylene diamine.

20. The thermoplastic resin composition of claim 1, wherein the composition is in particulate form.

21. The thermoplastic resin composition of claim 1, comprising about 0.001 to about 0.1 pbw metal phosphate salt.

22. The thermoplastic resin composition of claim 1, comprising about 0.005 to about 0.05 pbw metal phosphate salt.

23. A thermoplastic article made by molding the thermoplastic resin of composition claim 1.

24. The thermoplastic resin composition of claim 1, wherein the metal phosphate salt is sodium benzene phosphinate.

25. The thermoplastic composition of claim 1, wherein the epoxy compound is 3,4-epoxy cyclohexylmethyl-3,4-epoxy cyclohexanecarboxylate.

26. A thermoplastic resin composition, comprising a mixture, based on 100 pbw of the thermoplastic resin composition, of:

(a) from about 1 to about 99 pbw of a polyetherimide resin comprising structural units of the formula:

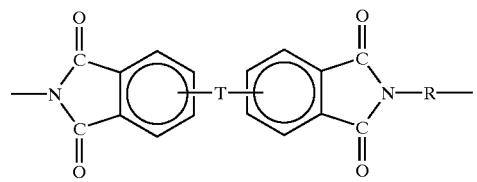

wherein each R is independently paraphenylene or metaphenylene and T is a divalent radical according to the formula:

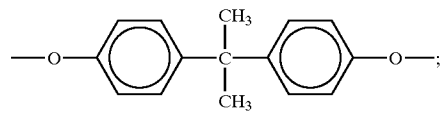

(b) from about 2 to about 15 pbw of a poly(cyclohexane-1,4-dimethylene terephthalate) resin;
(c) from 0 to about 48 pbw of one or more copolyester resins, wherein said copolyester resins each comprise recurring structural units, each structural unit comprises a diol residue and a diacid residue, each of the structural units comprises a 1,4-phenylene or 1,3-phenylene radical as the diacid residue of the structural unit and from 50 to 90 mole percent of the structural units comprise a dimethylene radical as the diol residue of the unit and from 0 to 50 mole percent of the structural units comprise a cyclohexane-1,4-dimethylene radical as the diol residue of the structural unit, and poly(ethylene terephthalate) resins; and
(d) up to about 1.5 pbw sodium benzene phosphinate; and
(e) up to about 6.0 pbw 3,4-epoxy cyclohexylmethyl-3,4-epoxy cyclohexanecarboxylate, sodium stearate, or a mixture thereof.

27. The thermoplastic resin composition of claim 26, comprising about 0.1 to about 2 pbw 3,4-epoxy cyclohexylmethyl-3,4-epoxy cyclohexanecarboxylate, about 0.001 to about 1.0 pbw sodium stearate, or a mixture thereof.

28. The thermoplastic resin composition of claim 26, wherein said poly(cyclohexane-1,4-dimethylene terephthalate) resin comprises about 0.5 to about 5.0 pbw 3,4-epoxy cyclohexylmethyl-3,4-epoxy cyclohexanecarboxylate, about 0.001 to about 0.1 pbw sodium stearate, or a mixture thereof.

29. The thermoplastic resin composition of claim 26, wherein the polyetherimide resin is the reaction product formed by melt polymerization of 2,2-bis[4-(3,4-dicarboxyphenoxy)phenyl]propane dianhydride with metaphenylene diamine.

30. The thermoplastic resin composition of claim 26, wherein the composition comprises from about 75 to about 90 pbw of the polyetherimide resin, from about 2 to about 12 pbw poly(cyclohexane-1,4-dimethylene terephthalate) resin and from about 2 to about 20 pbw of the second polyester resin.

31. The thermoplastic resin composition of claim 26, comprising about 0.001 to about 0.1 pbw sodium benzene phosphinate.

32. The thermoplastic resin composition of claim 31, comprising about 0.005 to about 0.05 pbw sodium benzene phosphinate.

33. A thermoplastic resin composition, comprising a mixture, based on 100 pbw of the thermoplastic resin composition, of:

(a) from about 60 to about 95 pbw of a polyetherimide resin, (b) from about 2 to about 15 pbw of a first polyester resin comprising recurring structural units, wherein each structural unit comprises a diol residue and a diacid residue and wherein from 90 to 100 mole percent of the structural units of the first polyester resin comprise a divalent alicyclic hydrocarbon radical as the diol residue of the structural unit, (c) from about 2 to about 48 pbw of a second polyester comprising recurring structural units, wherein each structural unit comprises a diol residue and a diacid residue and wherein from 0 mole percent to less than 90 mole percent of the structural units of the second polyester resin comprise a divalent alicyclic hydrocarbon radical as the a diol residue of the structural unit, and provided that, if the second polyester comprises structural units wherein the diol residue is a dimethylene radical, then the second polyester does not comprise any structural units wherein the diacid residue is a 2,6-naphthalene dicarboxylate radical;

(d) about 0.001 to about 0.1 pbw sodium benzene phosphinate; and (e) up to 5.0 pbw 3,4-epoxy cyclohexylmethyl-3,4-epoxy cyclohexanecarboxylate, sodium stearate, or a mixture thereof.

34. The thermoplastic resin composition of claim 33, comprising about 0.1 to about 2.0 pbw 3,4-epoxy cyclohexylmethyl-3,4-epoxy cyclohexanecarboxylate or about 0.001 to about 1.0 pbw sodium stearate, or a mixture thereof.

35. The thermoplastic resin composition of claim 33, comprising about 0.005 to about 0.05 pbw sodium benzene phosphinate.

* * * * *